July 26, 1966  G. MARTIN ETAL  3,263,007
METHOD OF MAKING A CERAMIC PLATEN FOR A BRAZING FIXTURE
Filed June 5, 1961 2 Sheets-Sheet 1

INVENTORS.
GEOFFREY MARTIN.
ESTILL GENE MUSIC.
BY
ATTORNEY.

July 26, 1966 G. MARTIN ETAL 3,263,007
METHOD OF MAKING A CERAMIC PLATEN FOR A BRAZING FIXTURE
Filed June 5, 1961 2 Sheets-Sheet 2

INVENTORS.
GEOFFREY MARTIN.
ESTILL GENE MUSIC.
BY
ATTORNEY

United States Patent Office 3,263,007
Patented July 26, 1966

3,263,007
METHOD OF MAKING A CERAMIC PLATEN FOR A BRAZING FIXTURE
Geoffrey Martin and Estill G. Music, Nashville, Tenn., assignors to Avco Corporation, Nashville, Tenn., a corporation of Delaware
Filed June 5, 1961, Ser. No. 114,787
3 Claims. (Cl. 264—60)

This invention relates to a method of making a fixture for holding metallic members while subjecting the same to various treatments such as heat treating or brazing, and a fixture resulting from the practice of such method. Since the brazing of various stainless steel alloys presents unique brazing and heat treating problems the method of the invention is particularly concerned with, but is not limited to, the manufacture of stainless steel honeycomb sandwich construction and includes the fabrication of a platen or mold and associated supporting and insulating structure (hereinafter sometimes referred to as a tool) in which the components of a stainless steel honeycomb sandwich are held in fixed and accurate relationship and in which such assembly can be subjected to the various treatments, such as purging, heating, suddenly cooling and reheating, or combined brazing and heat treating, required to effect satisfactory brazing into a strong unitary structure. The invention is also applicable to hot forming metals, or heat treating metals or metal structures, or both, wihout preliminary brazing. Stainless steel honeycomb sandwich structures are of great utility in connection with high altitude aircraft and/or structures requiring great strength per unit weight.

In the fabrication of complex metal shapes, such as airfoils or fuselages of aircraft, it has been common practice to construct a master pattern of the desired part, create a reverse mold of such part, cast a ceramic material into said mold and use the ceramic casting so formed as a pattern for fabricating the part. The present invention permits the fabrication of the desired part by building up a reference platen directly upon the master pattern, which platen can be easily removed and used directly to locate the metal members to be fabricated into said part, thus avoiding the necessity for casting intermediate molds.

The tool of the present invention has excellent mechanical strength and shock resistance at temperatures ranging from —200 degrees F. to +2000 degrees F., a very low coefficient of expansion, the property of being readily adapted to contours embodying smooth or compound curves and the capability of being easily repaired in the event of accidental breakage under extreme conditions. It permits brazing to be accomplished by the efficient application of heat at the precise areas where it is needed and without employing massive heat radiation, as in a brazing furnace. It also permits excellent temperature control and rapid heat response in one or more specially localized zones. Cooling of the brazed assembly may be accomplished quickly and cooling and uniform sub-zero temperatures can be applied without removing the brazement from the place in which it was assembled.

By way of illustration and not of limitation, the method of the invention may be briefly described as a method of fabricating a straight or curved ceramic tool for brazing metal components in situ, comprising the steps (1) of fabricating a master pattern to provide a reference face, (2) applying a release film thereover, (3) dividing the surfaces of said pattern into zones, (4) mounting continuous tube forms in each zone at predetermined distances from and parallel to the surface of the pattern, (5) vibration troweling a thixotropic siliceous mix into and throughout certain zones and around said tube forms, (6) allowing the mix in said zones to "set" sufficiently to acquire a substantial green strength, (7) vibration troweling said mix into and throughout the remaining zones, (8) allowing the mix in said remaining zones to "set" sufficiently to acquire a substantial green strength, (9) cementing a heat insulating support to the outer surface of the dried ceramic platen formed by the foregoing steps, and (10) subjecting said composite structure to temperatures in excess of 450 degrees F. to form a monolithic structure upon which the metal components may be mounted for effecting the brazing thereof into a unitary whole.

Objects of the invention include the provision of a method for making a tool embodying the advantages noted which can be accomplished simply, easily and economically, and is well adapted to efficient commercial production.

Another object is to provide a tool which can be used efficiently, economically and satisfactorily to braze metallic structures without employing a brazing furnace and without the casting of separate intermediate molds.

The novel features that we consider characteristic of our invention are set forth in the appended claims; the invention itself, however, both as to its organization and method of operation, together with additional objects and advantages thereof, will best be understood from the following description of specific embodiments when read in conjunction with the accompanying drawings, in which:

Figure 1:
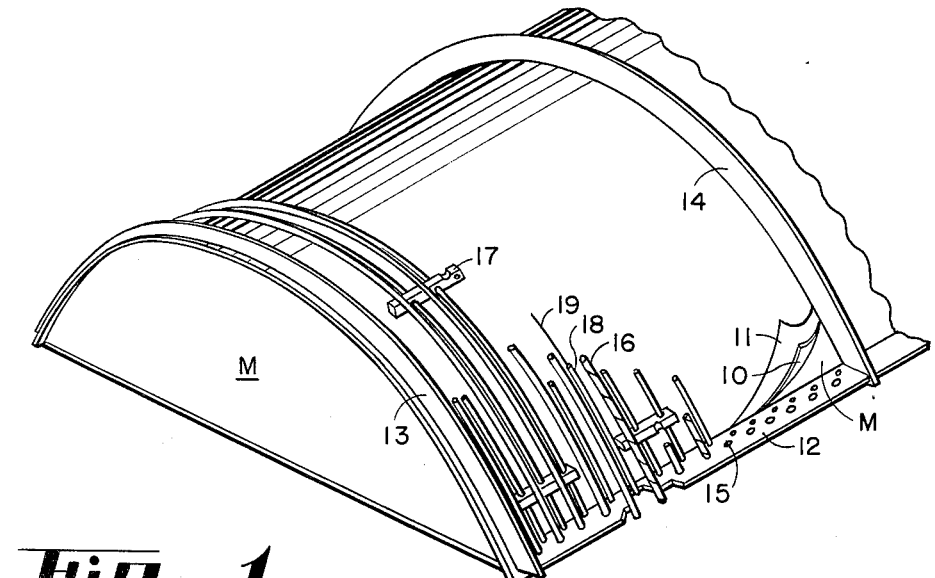
FIG. 1 is an isometric view of an illustrative embodiment of a master pattern with which and upon which the method of the invention may be accomplished.

In accordance with the invention, a master pattern or mold M (referring to FIG. 1) is built up to provide the exact configuration, surface contours, and dimensions required to define the precise outside dimensions of the assembly to be brazed. Over this master may be applied a suitable release film such as a combination of glass cloth 10 and a plastic film 11. This structure is desirably held in intimate contact with the master pattern by applying a vacuum between the reference face of the mold and the release film. A form or lay-up comprising longitudinal guide rails 12, for example, of aluminum and transverse guide rails 13, 14 of wood or pressed wood fiber product such as that sold under the trade name "Masonite" and of a width measured to the desired thickness of the platen to be constructed, are positioned upon and secured to the surface covered by the release film.

Holes 15 are desirably drilled in each set of opposite longitudinal guide rails to which tubes or rods 16, of destructible material such as cardboard, are indexed to provide the molds for the channel passages ultimately to be provided in the platen so they will extend therethrough approximately centrally thereof. Dependent upon the platen mass, it may be desirable to make the platen in modules for minimizing the tendency of shrinkage of a large mass during drying. Modular ceramic lay-ups may be provided with additional transverse rails (not shown) to define the areas in which the ceramic material is to be applied.

When the mold surface is curved or contoured or of considerable area, ceramic spacers 17 of the same material as the platen may be used to provide fixed points to properly reference the channel passage tubes or rods from the mold line. Rods 18, preferably of metal coated with a release agent, the ends of which may be threaded into and extended through suitable openings in the longitudinal rails 12, may be secured to such rails as by retaining nuts, in order to reinforce the platen and to provide separate channels for carrying heating means such as resistance elements 19, the function of which will be to heat the platens during the curing and/or one or more of the brazing or thermal treatments subsequently required.

Upon completion of the form or lay-up a thixotropic ceramic mix of siliceous material (hereinafter more particularly described for purposes of illustration but forming the subject matter of a separate application of Geoffrey Martin filed concurrently herewith) is vibration troweled between the guide rails. This is accomplished by placing the wetted ceramic mix on a vibrating metal trough. The trough, preferably slightly wider than the mold module, and extending over the adjacent side rails 13, 14, is desirably positioned at an angle to the mold rails. It is then raised from the bottom of the mold toward the top in contact with the transverse guide rails and imparts vibration forces to the mix as well as to the mold itself, thereby inducing the thixotropic mix to flow and completely fill all areas of the mold while driving out air that would otherwise be entrapped. In the course of filling the mold, the trough is moved slowly upward or away from the starting position to traverse the entire extent of the mold or mold modules.

During this operation it is possible that some "slump" or surplus of ceramic will produce an irregular, wavy exterior platen surface. This may be removed by immediately trimming to the guide rails, using a taut wire and a back and forth sawing motion with light constant pressure applied in the direction of cutting.

If the mix is to be applied to additional modules, adjacent guide rails are successively removed from the mold lay-up to permit the ceramic of successive modules to chemically and physically interlock with the modules previously formed.

Ceramic modules should dry from twenty-four to forty-eight hours depending on existing temperature and humidity conditions. After drying, the modules have good green strength and are subject to minimum shrinkage during subsequent operations. Adjacent or remaining sections are vibration troweled according to the same procedure above outlined. It will thus be seen that the vibration of non-adjacent sections will not injure existing "green" modules.

During the initial portion of the drying cycle, the ceramic should be uniformly dried by subjecting it to high humidity conditions or by covering it with a substantially waterproof covering for a period of eight to twelve hours after application in order to retard the drying rate. This minimizes the shrinkage rate differences between the surface and subsurface material. The green ceramic should not be moved or subjected to vibration or stresses for at least thirty-six hours after the removal of the covering. Longer drying periods may be required for sections greater than 1½" in thickness.

Before removal of the platen shape from the mold reference face, a non-metallic insulating back-up structure of high compression strength but low coefficient of expansion, such as blocks of foamed silica are desirably cemented to the ceramic platen to support it and provide rigidity, strength and insulation.

On completion of drying of the entire structure at room temperature the ceramic reference platen portion is cured by the application of heat. This can be done by heating the entire tool structure but is preferably done by locally applying heat to the platen by energizing the resistance element 19.

Excellent ceramic properties are developed by raising the temperature step by step to approximately 1800 degrees F. Typical properties developed by the ceramic platen of the type specified and processed as described herein are as follows:

| | |
|---|---|
| Density | 96 lbs./cu. ft. |
| Compressive strength | 3115 p.s.i. |
| Bending stress (1" of thickness) | 578 p.s.i. |
| Thermal conductivity, B.t.u./sq. ft./hr./° F./in.: | |
| 300° F. | 2.7 (actual). |
| 600° F. | 3.4 (actual). |
| 900° F. | 3.95 (actual). |
| 1200° F. | 4.25 (projected). |
| 1500° F. | 4.4 (projected). |
| 1800° F. | 4.5 (projected). |
| Thermal shock resistance | Sample did not crack when water quenched from 1800° F. |

This material has good green strength, and in this condition may be readily cut, ground, drilled or abrasively surfaced.

After "firing" of the entire platen the joints between the modules exhibit a high percentage of the strength of the parent material.

Figure 5:
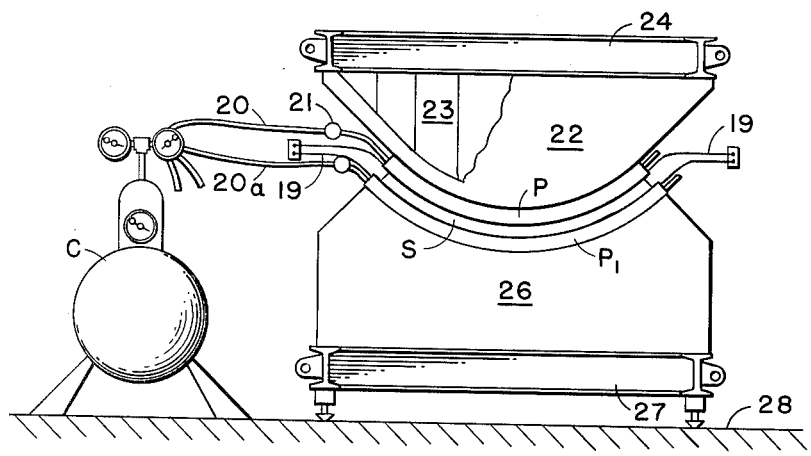
FIG. 5 is an end elevation showing a completed tool comprising two halves, one having been produced from the master reference pattern and the other having been produced from the first half, without the use of additional reference tooling.

The structure resulting from the above-outlined procedure may conveniently serve as one-half of a brazing or heat treating tool. The complementary half is desirably built up in the same way with the initial half serving as the master pattern, and the two halves may be suitably mounted as shown in FIG. 5 so that they firmly support the components of a metallic honeycomb sandwich structure S for a period of time and under the conditions required to effect brazing and heat treating. This processing can be carried out by successively heating the assembly by the suitable application of electric current to the resistance means 19, cooling the same by passing cooling gas such as compressed air through manifolds 21 and passages 16, 40 that have been provided in the platen. When required a low temperature gas such as converted liquid nitrogen may be released from source (not shown) through converters C and conduits 20, 20a which are connected to the cooling ducts 16, 40. After cooling the structure S may be reheated by reenergizing means 19.

It should be noted that during the entire sequence of steps previously outlined, the sandwich elements are held in situ with respect to the reference tooling and do not have to be disturbed or moved. This greatly facilitates processing and enables the assembly to be accurately fabricated into a unitary structure having the predetermined configuration desired.

Figure 2:
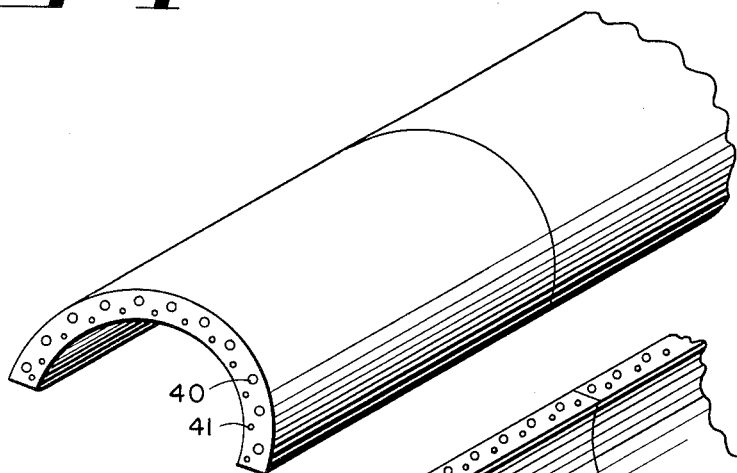
FIG. 2 is an isometric view, without a supporting structure, of a partial ceramic reference platen constructed in accordance with the invention, arranged with passages and conduits extending longitudinally therethrough.
Figure 3:
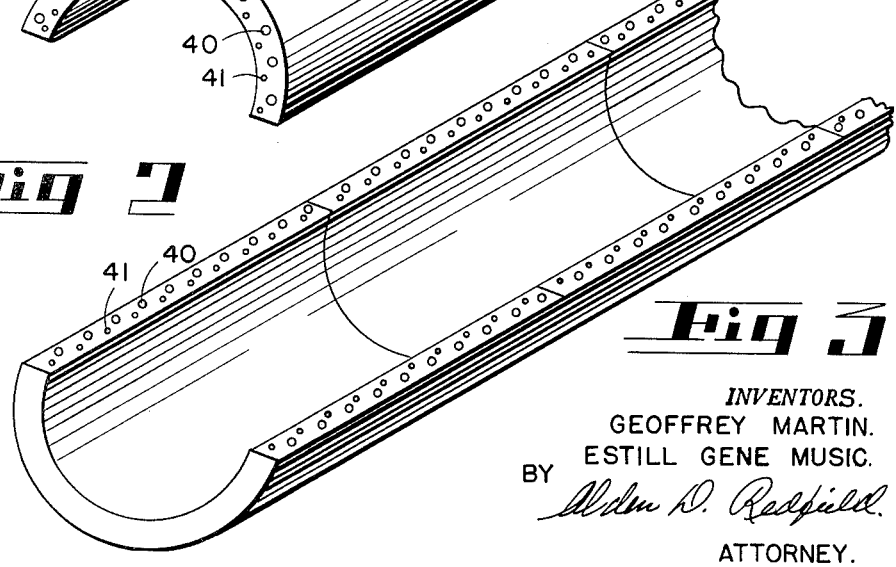
FIG. 3 is a view similar to FIG. 2 in which the passages and conduits are arranged circumferentially.

FIGS. 2 and 3 show alternative constructions of a half tool in which fluid passages 40 and other passages 41 carrying resistance elements are disposed in different positions. In each case the latter means are desirably located closer to the working face of the platen than are the passages 40.

Figure 4:
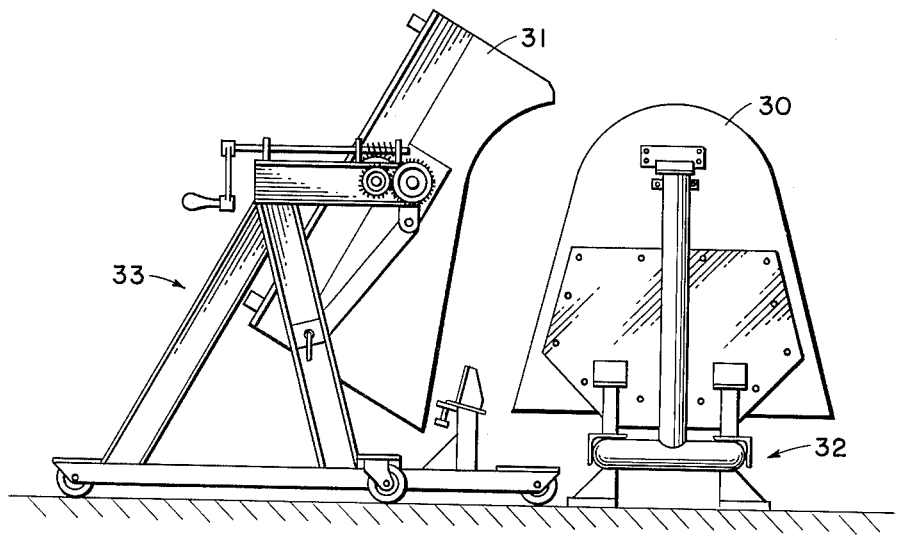
FIG. 4 is an end elevation showing a master pattern and the removal of a completed half tool therefrom.

In FIG. 4 we have shown a master pattern 30, parts of which are in nearly vertical position, and on which one half of a tool 31 has been fabricated. The one-half tool 31 may be mounted on support 33, movable toward and away from support 32 to which the master pattern is permanently secured.

FIG. 5 shows how the reference platens P and P' may be supported by backing blocks 23 cemented thereto and to each other as by a cementitious mixture of the type disclosed herein. The upper half of the entire tool is carried by frame 24. The other portion 26 may be similarly carried in frame 27 which may be supported on foundation 28. The platen portions P and P' which have been built up as above described securely hold the structure S which is to be brazed or heat treated.

Figure 6:
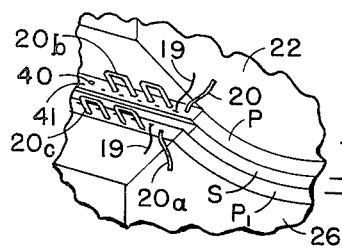
FIG. 6 is a fragmentary perspective showing how cooling fluid connections may be made to the platens when in operating position.

In FIG. 6 is shown how tubes or conduits 20, 20a may be connected to passages 16, 40, as by force fitting them into the passages and providing cross-over conduits 20b and 20c to interconnect certain passages to extend the cooling effect over a greater area. These may be interlaced between the upper platen P and lower platen P'.

The thixotropic ceramic material described above may be vibration troweled directly on the master model, or upon any reference model whether it is in a horizontal or almost vertical attitude. This material has the unique characteristic of thixotropicity that sharply differentiates it from previous castable ceramics. An illustrative formation is as follows, referring to U.S. Bureau of Standards Sieve Standards:

—200 finely ground fused silica—6 lbs. 14 oz. (+ or —½ oz.)
—20 +50 fused silica grains—11 lbs. 9 oz. (+ or —½ oz.)
—50 +100 fused silica grains—11 lbs. 9 oz. (+ or —½ oz.)
Slaked lime—10 grams (+ or —½ gram)
Colloidal silica—3500 cc.

The finely ground fused silica noted in the above illustration is desirably of the type sold commercially as Glascast Flour. The silica grains may be of the type known as Glascast Grain sold by Pittsburgh Corning Company of Pittsburgh, Pennsylvania. The liquid colloidal silica binder may be of the type known as Nalcoag Binder No. 50 sold by the Nalco Co. of Chicago, Illinois, comprising approximately 50% solids and 50% water.

It will be noted that all the ceramic particles in the above composition are silicon dioxide in the form of grains of fused silica in three categories of particle size, the two larger particle size categories bearing to the smaller particle size category an approximation ratio of 3:3:2, by weight. We have found this ratio to be quite necessary in order to give the desired properties with minimum amount of liquid binder and to yield a product least subject to cracking upon drying.

These dry ingredients and slaked lime are mixed, preferably in a power mixer, for approximately fifteen minutes. The binder is then added to the mixed dry ingredients and mixing is continued for approximately five minutes or until the "wet" mix shows signs of green strength. At this stage the mix has the apparent consistency of damp sand and is not flowable (except upon vibration). The material is then ready to apply to the desired mold shape.

The addition of slaked lime is for the purpose of controlling the set-up time of the green ceramic and of promoting the bonding of the particles together by combining with the other ingredients. It is believed that this binding is not only mechanical in character but also in part chemical with the formation of calcium silicate compounds.

It will be noted particularly that a ceramic material compounded as above described is thixotropic in character and has the appearance prior to use of a fairly solid damp aggregate which will not flow under ordinary conditions at room temperature. The material, however, has the property of becoming sufficiently liquid to flow when subjected to vibration and can be vibration troweled directly upon a reference model of attitude varying from horizontal to near vertical since it "sets" quite firmly after it has assumed equilibrium.

Having thus described our invention, we claim:

1. A method of forming a ceramic platen for brazing metals in situ, comprising the steps of
   (1) forming a master pattern,
   (2) coating the pattern with a release film,
   (3) dividing the surfaces of said pattern into workspace zones,
   (4) mounting continuous tube forms within each zone equidistant from the surface of the pattern,
   (5) utilizing a vibratory trowel-like element to deposit a thixotropic siliceous mix into and distribute it throughout a first zone and around said tube forms and to smooth and level the unsupported surface of the deposited mix,
   (6) allowing the mix in said zone to "set" sufficiently to acquire a substantial green strength,
   (7) similarly depositing and distributing said mix successively into and throughout the next-adjacent zone,
   (8) allowing the mix in said zone to "set" sufficiently to acquire a substantial green strength,
   (9) cementing a heat insulating support to a supporting surface of the dried ceramic platen formed by the foregoing steps, and
   (10) subjecting said composite structure to temperatures elevated in steps up to 1800 degrees F. to form monolithic structure upon which the metal components to be brazed may be mounted for effecting the brazing thereof into a unitary whole.

2. A method of forming a ceramic platen for brazing metals in situ, comprising the steps of
   (1) forming a master pattern,
   (2) dividing the surfaces of said pattern into workspace zones,
   (3) mounting continuous tube forms within each zone equidistant from the surface of the pattern,
   (4) utilizing a vibratory trowel-like element to deposit a thixotropic siliceous mix into and distribute it throughout a first zone and around said tube forms and to smooth and level the unsupported surface of the deposited mix,
   (5) allowing the mix in said zone to "set" sufficiently to acquire a substantial green strength,
   (6) similarly depositing and distributing said mix successively into and throughout the next-adjacent zone,
   (7) allowing the mix in said zone to "set" sufficiently to acquire a substantial green strength,
   (8) cementing a heat insulating support to a supporting surface of the dried ceramic platen formed by the foregoing steps, and
   (9) subjecting said composite structure to temperatures elevated in steps up to approximately 1800 degrees F. to form monolithic structure upon which the metal components to be brazed may be mounted for effecting the brazing thereof into a unitary whole.

3. A method of forming a ceramic platen for brazing metals in situ, comprising the steps of
   (1) forming a master pattern,
   (2) dividing the surfaces of said pattern into workspace zones,
   (3) mounting continuous tube forms within each zone at equal distances from and parallel to the surface of the pattern,
   (4) utilizing a vibratory trowel-like element to deposit a thixotropic siliceous mix into and distribute it throughout a first zone and around said tube forms and to smooth and level the unsupported surface of the deposited mix,
   (5) allowing the mix in said zone to "set" sufficiently to acquire a substantial green strength,
   (6) similarly depositing and distributing said mix successively into and throughout the next-adjacent zone,
   (7) allowing the mix in said zone to "set" sufficiently to acquire a substantial green strength,
   (8) cementing a heat insulating support to a supporting surface of the dried ceramic platen formed by the foregoing steps, and
   (9) raising the temperature of the assembly up to approximately 1800 degrees F.

References Cited by the Examiner

UNITED STATES PATENTS

| | | | |
|---|---|---|---|
| 771,594 | 10/1904 | Wilhelmi | 264—279 |
| 1,183,809 | 5/1916 | Frisbee et al. | 148—131 |
| 1,768,546 | 7/1930 | Curtis. | |

(Other references on following page)

UNITED STATES PATENTS

| | | | |
|---|---|---|---|
| 2,182,775 | 12/1939 | Abouchar | 18—47 |
| 2,209,099 | 7/1940 | Grueneklee | 257—303 |
| 2,253,697 | 8/1941 | Genesy | 18—47 |
| 2,315,294 | 3/1943 | Stewart et al. | 29—487 |
| 2,348,829 | 5/1944 | MacArthur et al. | |
| 2,387,835 | 10/1945 | Day et al. | 148—131 |
| 2,687,278 | 8/1954 | Smith et al. | 253—39.15 |
| 2,912,556 | 11/1959 | Hold | 257—303 |
| 2,986,811 | 6/1961 | Rudd | 29—487 |
| 3,060,543 | 10/1962 | Shaw | 264—60 |
| 3,112,388 | 11/1963 | Wiant | 219—85 |
| 3,112,389 | 11/1963 | Wiant | 219—85 |

ROBERT F. WHITE, *Primary Examiner.*

JOHN F. CAMPBELL, ALEXANDER H. BRODMERKEL, *Examiners.*

C. I. SHERMAN, J. A. FINLAYSON,
*Assistant Examiners.*